United States Patent Office 3,517,004
Patented June 23, 1970

3,517,004
BRIDGED 1,5-DIAZACYCLODECANES
William J. Houlihan, Mountain Lakes, N.J., assignor to Sandoz-Wander, Inc., a corporation of Delaware
No Drawing. Continuation-in-part of application Ser. No. 566,719, July 21, 1966. This application Oct. 27, 1967, Ser. No. 678,528
Int. Cl. C07d 51/46
U.S. Cl. 260—251                5 Claims

ABSTRACT OF THE DISCLOSURE

Bridged 1,5-diazacyclodecanes, e.g., 9-(p-methoxyphenyl)-1,5-diazabicyclo[4.3.1]decane, are prepared from 1,5-diazabicyclononanes and are useful as antidepressants.

---

This application is a continuation-in-part of application Ser. No. 566,719, filed July 21, 1966, now abandoned.

This invention relates to novel heterocyclic compounds. In particular, the invention pertains to bridged 1,5-diazacyclodecanes and methods for preparing the same. The invention also relates to intermediates which are useful in preparing the above compounds and processes for preparing said intermediates.

The end compounds of the present invention may be represented structurally as follows:

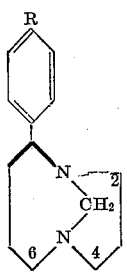

wherein R represents hydrogen; chloro; or lower alkoxy, preferably containing from 1 to 4 carbon atoms, e.g., methoxy, ethoxy, propoxy and butoxy.

The above compounds may be prepared by reacting 3-benzoyl-propionic acid or an appropriately substituted derivative thereof with 3-hydrazinopropanol to form the corresponding 2-(3-hydroxypropyl)-6-phenyl - 4,5 - dihydropyridazin(2H)-3-one. The latter is then either converted (via halide synthesis) to the corresponding 2-(3-chloropropyl)-6-phenyl-4,5-dihydropyridazin(2H)-3 - one or reduced to form the corresponding 1-(3-hydroxypropyl)-3-phenyl-hexahydropyridazine. Either of the compounds thus obtained is then converted to the corresponding 9-phenyl-1,5-diazabicyclo[4.3.0]nonane which in turn is reacted with a methyl halide to form the $N_5$-(methyl)halide salt thereof. The latter is then converted to the desired 1,5-diazabicyclo[4.3.1]decane by treatment with an alkali metal alkoxide.

The above process may be illustrated structurally as follows:

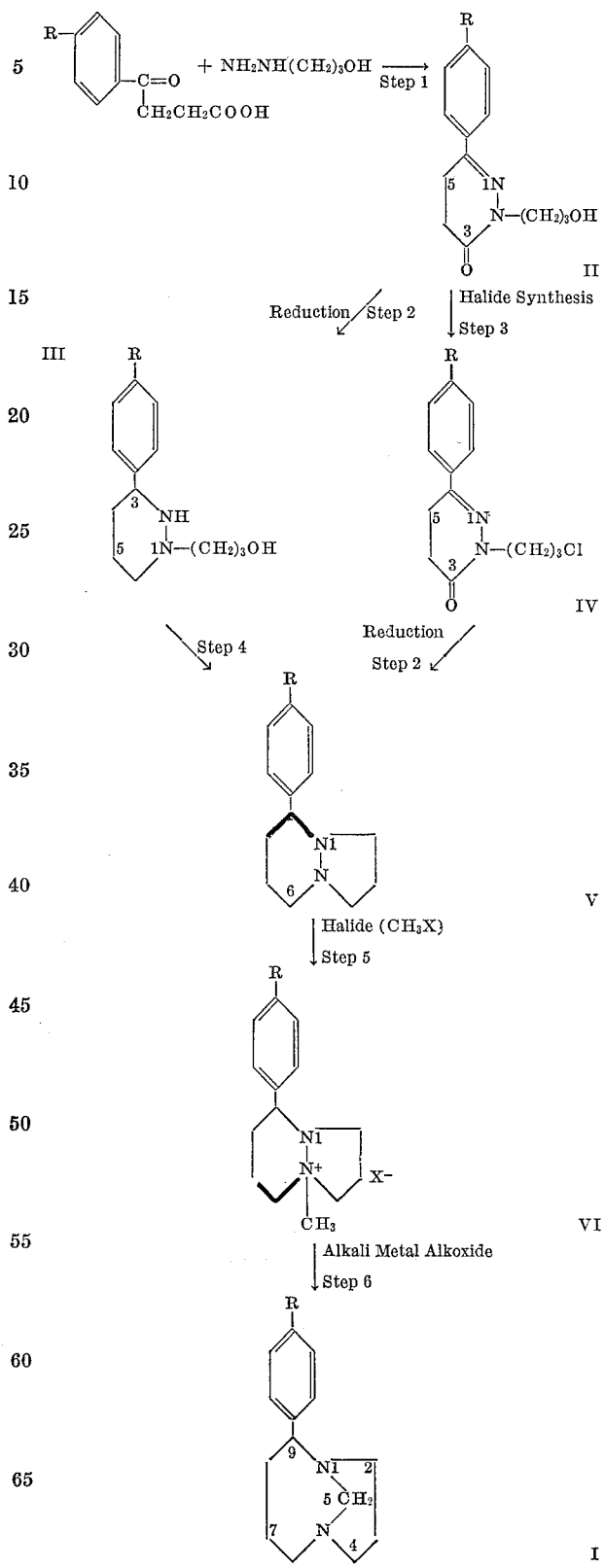

In the above formulae R is as defined above, and X is a halogen having an atomic weight of at least 35, i.e., chloro, bromo or iodo.

As illustrated above, Step 1 of the process involves the reaction of a 3-benzoylpropionic acid with 3-hydrazinopropanol to form the corresponding 2-(3-hydroxypropyl)-6-phenyl-4,5-dihydropyridazin(2H)-3-one (II). This reaction is conveniently carried out in the presence of an inert organic solvent and at elevated temperatures. However, neither the solvent nor temperature employed is critical. Suitable solvents include benzene, toluene, xylene and chlorobenzene. Preferably, the reaction is carried out at reflux temperature to facilitate continuous removal of water. To facilitate the formation of water, the reaction may be carried out in the presence of a catalytic amount of hydrogen ions such as by the use of an arylsulfonic acid, e.g., benzenesulfonic acid, p-toluenesulfonic acid and the like. The resulting product (II) can be readily isolated employing conventional techniques.

The reduction (Step 2) of the pyridazinone (II) or (IV) to the corresponding pyridazine (III) or diazabicyclononane (V), respectively, is readily carried out employing a hydride reducing agent, preferably an aluminum hydride, such as lithium aluminum hydride, butyl aluminum hydride, triisobutyl aluminum hydride and the like. The reduction is conveniently effected in the presence of an inert organic solvent and at an elevated temperature, preferably reflux temperature. Suitable solvents include the ethers, such as diethyl ether and the like, and mixtures of ethers and benzene or toluene. However, neither the solvent nor temperature employed is critical. The resulting products (III) or (V) are readily recovered in conventional manner.

Step 3 of the process involves the conversion of the 2-(3-hydroxypropyl)-pyridazinone (II) to the corresponding 2-(3-chloropropyl)-pyridazinone (IV). This is accomplished in standard manner employing any of the conventional agents used for this purpose. The preferred agent, however, is thionyl chloride. The reaction is conveniently carried out in any suitable inert organic solvent, such as, for example, benzene, hexane, dichloromethane, chloroform and carbon tetrachloride. It is preferred to carry out the reaction at reflux temperature, but it can be carried out at room temperature (20° C.) if desired. The resulting product (IV) can be readily recovered in conventional manner.

The conversion of the pyridazine (III) to the corresponding diazabicyclononane (V), as indicated by Step 4 of the above reaction scheme is effected employing the same conditions as set forth for Step 3. This reaction provides via halide synthesis and spontaneous ring closure the diazabicyclononane (V).

Steps 5 and 6 of the process involve the introduction of the methyl substituent into the ring system followed by the formation of the bridged 1,5-diazabicyclodecane. In Step 5 the diazabicyclononane (V) is reacted with a methyl halide to form the corresponding $N_5$-methyl halide salt thereof (VI). This reaction is conveniently carried out in the presence of a suitable inert organic solvent, such as, for example, diethyl ether, pentane, hexane, benzene, toluene, xylene, dichloromethane and chloroform. It is preferred to carry out the reaction at room temperature or below although elevated temperatures up to reflux temperature can be employed if desired. The resulting halide salt (VI), which is readily isolated employing conventional techniques, is then converted to the desired corresponding bridged 1,5-diazabicyclodecane (I) by reacting the halide salt (VI) with an alkali metal alkoxide (Step 6). Suitable alkoxides include the lithium, potassium and sodium derivatives of lower aliphatic alcohols, such as, for example, lithium methoxide, sodium methoxide, sodium ethoxide, potassium methoxide, potassium ethoxide and the like. The reaction is conveniently carried out in a suitable inert organic solvent such as an aliphatic alcohol, for example, methanol, ethanol, propanol and the like, and at an elevated temperature, preferably reflux temperature. However, neither the solvent nor temperature employed is critical. It should be noted that the formation of the bridged 1,5-diazabicyclodecane via the reaction of the halide salt (VI) with the alkali metal alkoxide is indeed unusual and was completely unexpected. The bridged 1,5-diazabicyclodecane (I) is readily recovered in conventional manner.

With respect to the various steps of the process discussed above, it is possible that the solvent employed therein can be dispensed with if any of the reactants employed are liquids at the temperature at which the reaction is conducted. In such instances an excess of such reactant can be used in lieu of the solvent.

Various of the propionic acids employed in Step 1 of the process are known and can be prepared as described in the literature. Such others which are not specifically disclosed in the literature may be readily prepared from available materials by methods analogous to those described in the liturature for the preparation of the known compounds.

All of the compounds of structural Formulas I, III, V and VI have asymmetric centers and therefore exist as optically active isomers. Separation and recovery of the respective isomers may be readily accomplished employing conventional techniques and such isomers are included within the scope of this invention.

The end compounds of the present invention in their free base form (compounds of Formula I) are useful because they possess pharmacological activity. In particular, such compounds are central nervous system stimulants and can be used as anti-depressants, as indicated by their activity in mice tested using the reserpine reversal method similar to that described by Brodie et al. (J. Pharmacol. and Exper. Therap. 116, 9, 1956) and Chessin et al. (J. Pharmacol. and Exper. Therap. 119, 453, 1957) and the delayed DOPA potentiation method similar to that described by Everett et al. (Fed. Proc. 23, 198, 1964). For such use the compounds may be combined with a pharmaceutically acceptable carrier, and such other conventional adjuvants, as may be necessary and administered orally in such forms as tablets, capsules, elixirs, suspenions or solutions, or parenterally in such form a inectable solutions, suspensions or emulsions. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts, such as the hydrochloride, hydrobromide, sulphate, phosphate and the like and the organic acid salts, such as the succinate, benzoate, acetate, p-toluenesulfonate, benzenesulfonate and the like.

As noted above, the compounds of Formula I exist as optical isomers. In some cases greater pharmacological activity or other beneficial attribute may be found with respect to a particular isomer and in such instances administration of such isomer may be preferred.

For the aforementioned uses, the dosage will, of course, vary depending on the compound employed, the therapy desired and mode of administration. In general, satisfactory results are obtained when these compounds are administered at a daily dose of about 1 to 5 milligrams to about 25 milligrams per kilogram of animal body weight. This daily dosage is preferably administered 2 to 4 times a day, or in sustained release form. For most large mammals, the total daily dose is from about 100 milligrams to about 600 milligrams. Dosage forms suitable for internal use comprise from about 25 milligrams to about 300 milligrams of the active compound in intimate admixture with a solid or liquid pharmaceutically acceptable carrier or diluent.

A representative formulation suitable for oral administration is a tablet prepared by standard tabletting techniques and containing the following:

| Ingredient: | Parts by weight |
|---|---|
| 9 - p - chlorophenyl - 1,5 - diazabicyclo[4.3.1]decane (or acid addition salt thereof) [1] | 50 |
| Tragacanth | 2 |
| Lactose | 39.5 |
| Corn starch | 5 |
| Talcum | 3 |
| Magnesium stearate | 0.5 |

[1] Calculated as the free base.

The following examples show representative compounds contemplated by this invention and the manner in which such compounds are prepared.

EXAMPLE 1

9-(p-methoxyphenyl)-1,5-diazabicyclo[4.3.1]decane

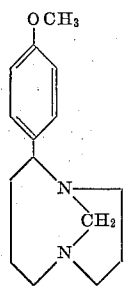

Step A.—Preparation of 2-(3-hydroxypropyl)-6-(p-methoxyphenyl)-4,5-dihydropyridazin(2H)-3-one To a flask equipped with a condenser, Dean-Stark tube and stirrer is added 20.8 g. (0.10 mole) of 3-p-methoxybenzoylpropionic acid, 13.5 g. (0.15 mole) of 3-hydrazinopropanol and 250 ml. of toluene. The mixture is stirred and refluxed until water ceases to separate in the Dean-Stark tube. The solvent is then removed in vacuo on a rotary evaporator to yield an oil which solidifies on standing. The resulting solid material is crystallized from chloroform-pentane to obtain 2-(3-hydroxypropyl)-6 - (p-methoxyphenyl)-4,5-dihydropyridazin(2H)-3-one, M.P. 117–118° C.

Step B.—Preparation of 1-(3-hydroxypropyl)-3-(p-methoxyphenyl)-hexahydropyridazine To a flask equipped with a stirrer, condenser, gas inlet tube and Soxhlet tube containing 50.0 g. (0.2 mole) of 2 - (3 - hydroxypropyl) - 6 - (p - methoxyphenyl)-4,5-dihydropyridazin(2H) - 3 - one is added under nitrogen atmosphere 14.3 g. (0.376 mole) of lithium aluminum hydride and 1500 ml. of absolute diethyl ether. The contents of the flask are stirred and refluxed for 80 hours and then cooled in an ice bath. To the cooled mixture is then added dropwise 28.6 ml. of 2 N sodium hydroxide and 42.9 ml. of water. The resulting mixture is then filtered and the filtrate concentrated on a rotary evaporator to obtain 1 - (3 - hydroxypropyl) - 3 - (p-methoxyphenyl)-hexahydropyridazine as a viscous oil.

Step C.—Preparation of 9-(p-methoxyphenyl)-1,5-diazabicyclo[4.3.0]nonane

To a flask equipped with a stirrer, condenser and dropping funnel is added 50.0 g. (0.20 mole) of 1-(3-hydroxypropyl)-3-(p-methoxyphenyl) - hexahydropyridazine and 500 ml. of dry chloroform. While stirring the mixture at room temperature, 21.3 ml. (0.3 mole) of thionyl chloride is added and the resulting mixture refluxed overnight. The chloroform solution is then washed first with 10% aqueous sodium bicarbonate solution until the wash is alkaline and then with saturated aqueous sodium chloride solution and the combined washings extracted twice with chloroform. The combined chloroform layers are then dried with sodium sulfate, filtered and the filtrate evaporated in vacuo on a rotary evaporator to yield crude 9 - (p - methoxyphenyl) - 1,5 - diazabicyclo[4.3.0]nonane, B.P. 140–152° C./6.5 mm.

A solution of 2.0 g. of the free base in dry diethyl ether is treated with hydrogen chloride gas and the resulting solid filtered off and dried to yield hygroscopic 9 - (p - methoxyphenyl) - 1,5 - diazabicyclo[4.3.0]nonane hydrochloride, M.P. 133–138° C.

Step D.—Preparation of $N_5$-methyl iodide salt of 9-(p-methoxyphenyl)-1,5-diazabicyclo[4.3.0]nonane To a flask equipped with a stirrer, dropping funnel and drying tube is added 24.2 g. (0.102 mole) of 9-(p - methoxyphenyl) - 1,5 - diazabicyclo[4.3.0]nonane and 500 ml. of diethyl ether. The mixture is stirred, and there is added thereto dropwise 19.0 ml. (0.204 mole) of methyl iodide. The resulting mixture is stirred overnight at room temperature and the resulting solids filtered off and crystallized from methylene chloride-diethyl ether to yield the $N_5$-methyl iodide salt of 9 - (p - methoxyphenyl) - 1,5 - diazabicyclo[4.3.0]nonane, M.P. 194–197° C.

Step E.—Preparation of 9-(p-methoxyphenyl)-1,5-diazabicyclo[4.3.1]decane

To a flask equipped with a stirrer, condenser, dropping funnel and gas inlet tube is added 4.6 g. (0.20 mole) of sodium in small pieces and 150 ml. of methanol. The system is then blanketed with nitrogen and 25.0 g. (0.067 mole) of the $N_5$-methyl iodide salt of 9-(p-methoxyphenyl)-1,5-diazabicyclo[4.3.0]nonane is added. The resulting mixture is stirred and refluxed for 5 days. The solvent is then removed in vacuo, the residue treated with ice water and then extracted with chloroform. The chloroform is then removed in vacuo, and the resulting semi-solid material extracted with pentane. The pentane extract is filtered and the filtrate concentrated in vacuo. The residue is distilled to obtain 9-(p-methoxyphenyl)-1,5-diazabicyclo[4.3.1]decane as a viscous oil, B.P. 190–195° C./0.25 mm. An ether solution of the base is treated with anhydrous hydrogen chloride to obtain the dihydrochloride salt thereof, M.P. 203–208° C.

EXAMPLE 2

9-(p-chlorophenyl)-1,5-diazabicyclo[4.3.1]decane

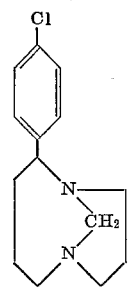

Step A.—Preparation of 2-(3-hydroxypropyl)-6-(p-chlorophenyl)-4,5-dihydroxypyridazin(2H)-3-one To a flask equipped with a condenser, Dean-Stark tube and stirrer is added 63.9 g. (0.30 mole) of 3-p-chlorobenzoylpropionic acid, 31.5 g. (0.35 mole) of 3-hydrazinopropanol and 500 ml. of toluene. The mixture is stirred and refluxed until water ceases to separate in the Dean-Stark tube. The solvent is then removed in vacuo on a rotary evaporator to yield an oil which solidifies on standing. The resulting solid material is crystallized from chloroform-pentane to obtain 2-(3-hydroxypropyl)-5-(p-chlorophenyl) - 4,5 - dihydropyridazin(2H) - 3 - one, M.P. 128–132° C.

Step B.—Preparation of 1-(3-hydroxypropyl)-3-(p-chlorophenyl)-hexahydropyridazine To a flask equipped with a stirrer, condenser, gas inlet tube and Soxhlet tube containing 53.4 (0.20 mole) of 2-(3-hydroxypropyl)-6-(p-chlorophenyl) - 4,5 - dihydropyridazin(2H)-3-one is added under nitrogen atmosphere 14.3 g. (0.376 mole) of lithium aluminum hydride and 1500 ml. of absolute diethyl ether. The contents of the flask are stirred and refluxed for 80 hours and then cooled in an ice bath. To the cooled mixture is then added dropwise 28.6 ml. of 2 N sodium hydroxide and 42.9 ml. of water. The resulting mixture is then filtered and the filtrate concentrated on a rotary evaporator to obtain 1-(3-hydroxypropyl)-3-(p-chlorophenyl)-hexahydropyridazine as a viscous oil. The latter solidifies on standing to yield product, M.P. 65–67° C.

Step C.—Preparation of 9-(p-chlorophenyl)-1,5-diazabicyclo[4.3.0]nonane

To a flask equipped with a stirrer, condenser and dropping funnel is added 18.0 g. (0.07 mole) of 1-(3-hydroxypropyl-3-(p-chlorophenyl)-hexahydropyridazine and 200 ml. of dry chloroform. While stirring the mixture at room temperature, 7.6 ml. (0.105 mole) of thionyl chloride is added and the resulting mixture refluxed overnight. The chloroform solution is then washed first with 10% aqueous sodium bicarbonate solution until the wash is alkaline and then with saturated aqueous chloride solution, and the combined washings extracted twice with chloroform. The combined chloroform layers are then dried with sodium sulfate, filtered and the filtrate evaporated in vacuo on a rotary evaporator to yield crude 9-(p-chlorophenyl)-1,5-diazabicyclo[4.3.0]nonane, B.P. 145–155° C./10.5 mm.

A solution of 2.0 g. of the free base in dry diethyl ether is treated with hydrogen chloride gas and the resulting solid filtered off and dried to yield hygroscopic 9-(p-chlorophenyl) - 1,4-diazobicyclo[4.3.0]nonane hydrochloride, M.P. 147–152° C.

Step D.—Preparation of N-methyl iodide salt of 9-(p-chlorophenyl)-1,5-diazabicyclo[4.3.0]nonane A mixture of 6.0 g. (0.025 mole) of 9-(p-chlorophenyl)-1,5-diazabicyclo[4.3.0]nonane, 7.2 g. (0.05 mole) of methyl iodide and 120 ml. of absolute diethyl ether is stirred for 20 hours at room temperature and resulting solids recovered by filtration to obtain the $N_5$-methyl iodide salt of 9-(p-chlorophenyl)-1,5-diazabicyclo[4.3.0]-nonane, M.P. 199–202° C.

Step E.—Preparation of 9-(p-chlorophenyl)-1,5-diazabicyclo[4.3.1]decane

To a flask equipped with a stirrer, condenser, dropping funnel and gas inlet tube is added 1.5 g. (0.065 mole) of sodium in small pieces and 50 ml. of methanol. The system is then blanketed with nitrogen and 8.0 g. (0.21 mole) of the $N_5$-methyl iodide salt of 9-(p-chlorophenyl)-1,5-diazabycyclo[4.3.0]nonane is added. The resulting mixture is stirred and refluxed for 5 days. The solvent is then removed in vacuo, the residue treated with ice water and then extracted with chloroform. The chloroform is then removed in vacuo and the resulting material extracted with pentane. The pentane extract is filtered and the filtrate concenrtated in vacuo. The residue is distilled at 160–170° C. in a Kugelrohr oven to obtain 9-(p-chlorophenyl)-1,5-diazabicyclo[4.3.1]-decane. An ether solution of the base is treated with anhydrous hydrogen chloride to obtain the monohydrochloride salt thereof, M.P. 188° to 191° C.

EXAMPLE 3

9-phenyl-1,5-diazabicyclo[4.3.1]decane

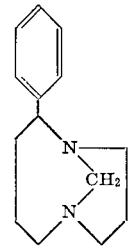

Step A.—Preparation of 2-(3-hydroxypropyl)-6-phenyl-4,5-dihydropyridazin(2H)-3-one To a flask equipped with a condenser, Dean-Stark tube and stirrer is added 44.5 g. (0.25 mole) of 3-benzoylpropionic acid, 27 g. (0.3 mole) of 3-hydrazinopropanol, 1 g. of p-toluenesulfonic acid and 500 ml. of toluene. The mixture is stirred and refluxed until water ceases to separate in the Dean-Stark tube. The solvent is then removed in vacuo on a rotary evaporator to yield an oil whcih solidifies on standing. The resulting solid material is crystallized from benzene-pentane to obtain 2-(3-hydroxypropyl)-6-phenyl-4,5-dihydropyridazin(2H)-3-one, M.P. 65° to 68° C.

Step B.—Preparation of 1-(3-hydroxypropyl)-3-phenyl-hexahydropyridazine

To a flask equipped with a stirrer, condenser, gas inlet tube and Soxhlet tube containing 30.0 g. (0.13 mole) of 2-(3-hydroxypropyl)-6-phenyl-4,5-dihydropyridazin(2H)-3-one is added under nitrogen atmosphere 34.4 g. (0.9 mole) of lithium aluminum hydride and 2000 ml. of absolute diethyl ether. The contents of the flask are stirred and refluxed for 80 hours and then cooled in an ice bath. To the cooled mixture is then added dropwise 68.8 ml. of 2 N sodium hydroxide and 103.2 ml. of water. The resulting mixture is then filtered, and the filtrate concentrated on a rotary evaporator to obtain 1-(3-hydroxypropyl)-3-phenyl-hexahydropyridazine as a viscous oil.

Step. C.—Preparation of 9-phenyl-1,5-diazabicyclo[4.3.0]nonane

To a flask equipped with a stirrer, condenser and dropping funnel is added 18.0 g. (0.08 mole) of 1-(3-hydroxypropyl)-3-phenylhexahydropyridazine and 60 ml. of dry chloroform. While stirring the mixture at room temperature, a solution of 5.6 ml. of thionyl chloride in 16 ml. of chloroform is added and the resulting mixture refluxed overnight. The chloroform solution is then washed first with 10% aqueous sodium bicarbonate solution until the wash is alkaline and then with saturated aqueous sodium chloride solution, and the combined washings extracted twice with chloroform. The combined chloroform layers are then dried with sodium sulfate, filtered, the filtrate evaporated in vacuo on a rotary evaporator and the residue distilled to yield 9-phenyl-1,5-diazabicyclo[4.3.0]nonanen, B.P. 93–95° C./0.7 mm.

A solution of 2.0 g. of the free base in dry diethyl ether is treated with hydrogen chloride gas, and the resulting solid filtered off and dried to yield hygroscopic 9-phenyl-1,5-diazabicyclo[4.3.0]nonane hydrochloride, M.P. 122–126° C.

Step D.—Preparation of $N_5$-methyl iodide salt of 9-phenyl-1,5-diazabicyclo[4.3.0]nonane A mixture of 5.0 g. (0.025 mole) of 9-phenyl-1,5-diazabicyclo[4.3.0]nonane, 7.1 g. (0.05 mole) of methyl iodide and 100 ml. of absolute diethyl ether is stirred for 20 hours at room temperature and the resulting solids recovered by filtration to obtain the $N_5$-methyl iodide salt of 9-phenyl-1,5-diazabicyclo[4.3.0]nonane, M.P. 200–202° C.

Step E.—Preparation of 9-phenyl-1,5-diazabicyclo [4.3.1]nonane

To a flask equipped with a stirrer, condenser, dropping funnel and gas inlet tube is added 1.5 g. (0.06 mole) of sodium in small pieces and 30 ml. of absolute methanol. The system is then blanketed with nitrogen and 7.0 g. (0.02 mole) of the $N_5$-methyl iodide salt of 9-phenyl-1,5-diazabicyclo[4.3.0]nonane is added. The resulting mixture is stirred and refluxed for 5 days. The solvent is then removed in vacuo, the residue treated with ice water and then extracted with chloroform. The chloroform is then removed in vacuo to yield 9-phenyl-1,5-diazabicyclo [4.3.1]decane. An ether solution of the base is treated with anhydrous hydrogen chloride to obtain the monohydrochloride salt thereof, M.P. 160–168° C.

What is claimed is:

1. A compound selected from the group consisting of 1,5-diazabicyclodecanes of the formula

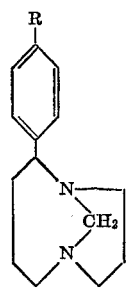

and non-toxic acid addition salts thereof, wherein R represents hydrogen, chloro or lower alkoxy.

2. The compound of claim 1 which is 9-(p-methoxyphenyl)-1,5-diazabicyclo[4.3.1]decane.

3. The compound of claim 1 which is 9-(p-chlorophenyl)-1,5-diazabicyclo[4.3.1]decane.

4. The compound of claim 1 which is 9-phenyl-1,5-diazabicyclo[4.3.1]decane.

5. A process for preparing a compound of claim 1 in free base form which comprises contacting at reflux temperature a compound of the formula

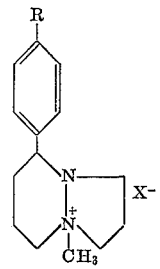

wherein:

X represents halogen having an atomic weight of at least 35; and

R is as defined in claim 1, with an alkali metal alkoxide selected from the group consisting of lithium, potassium and sodium derivatives of methanol, ethanol or propanol.

References Cited
UNITED STATES PATENTS 3,159,647  12/1964  Poppelsdorf _____ 260—309.7

RAYMOND V. RUSH, Primary Examiner

U.S. Cl. X.R.

260—250; 424—251